US012752538B2

(12) United States Patent
Inui et al.

(10) Patent No.: US 12,752,538 B2
(45) Date of Patent: Oct. 6, 2026

(54) INK JET RECORDING APPARATUS INCLUDING BLADE FOR CLEANING NOZZLE SURFACE

(71) Applicant: KYOCERA Document Solutions Inc., Osaka (JP)

(72) Inventors: Yasutaka Inui, Osaka (JP); Shunsuke Yamasaki, Osaka (JP); Shuhei Kawamata, Osaka (JP); Yuko Yano, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 149 days.

(21) Appl. No.: 18/828,292

(22) Filed: Sep. 9, 2024

(65) Prior Publication Data

US 2025/0091351 A1 Mar. 20, 2025

(30) Foreign Application Priority Data

Sep. 19, 2023 (JP) ................................ 2023-150926

(51) Int. Cl.
*B41J 2/165* (2006.01)
*B41J 25/304* (2006.01)

(52) U.S. Cl.
CPC ......... *B41J 2/16552* (2013.01); *B41J 25/304* (2013.01); *B41J 2002/16558* (2013.01); *B41P 2235/21* (2013.01)

(58) Field of Classification Search
CPC ................ B41J 2/16552; B41J 2/16517; B41J 2002/16558; B41J 25/304; B41P 2235/21
See application file for complete search history.

(56) References Cited

U.S. PATENT DOCUMENTS

| | | | | |
|---|---|---|---|---|
| 2010/0053280 | A1* | 3/2010 | Ohashi | B41J 2/17513 347/86 |
| 2015/0273836 | A1* | 10/2015 | Akuta | B41J 2/16538 347/33 |
| 2017/0297339 | A1* | 10/2017 | Midorikawa | B41J 2/16547 |
| 2018/0154640 | A1* | 6/2018 | Furukawa | B41J 2/16535 |
| 2018/0194141 | A1 | 7/2018 | Araki et al. | |
| 2019/0009553 | A1* | 1/2019 | Nakai | B41J 2/16517 |
| 2022/0314623 | A1 | 10/2022 | Matsuyama | |

FOREIGN PATENT DOCUMENTS

| | | |
|---|---|---|
| JP | 2000158667 A | 6/2000 |
| JP | 2018108711 A | 7/2018 |

* cited by examiner

*Primary Examiner* — Stephen D Meier
*Assistant Examiner* — Thomas Ray Knief
(74) *Attorney, Agent, or Firm* — IP Business Solutions, LLC.

(57) ABSTRACT

An ink jet recording apparatus includes a recording head, a blade, and a cleaning liquid dispensing unit. The recording head includes a nozzle surface including a plurality of nozzles each having an ink outlet oriented downward, and is supported so as to move in an up-down direction. The blade wipes the nozzle surface, by moving in a predetermined moving direction in contact with the nozzle surface. The cleaning liquid dispensing unit stores therein cleaning liquid supplied from a cleaning liquid supply source, and supplies the cleaning liquid between a travel start position of the blade and the nozzle surface. The cleaning liquid dispensing unit includes a receptacle in which the cleaning liquid that has been supplied is stored, the receptacle having a top face open upward.

7 Claims, 17 Drawing Sheets

INK JET RECORDING APPARATUS INCLUDING BLADE FOR CLEANING NOZZLE SURFACE

INCORPORATION BY REFERENCE

This application claims priority to Japanese Patent Application No. 2023-150926 filed on Sep. 19, 2023, the entire contents of which are incorporated by reference herein.

BACKGROUND

The present disclosure relates to an ink jet recording apparatus including a blade that wipes a nozzle surface of a recording head with cleaning liquid.

Existing ink jet recording apparatuses generally include a wipe unit that moves a blade along a nozzle surface of a recording head, thereby wiping the nozzle surface. When the blade moves along the nozzle surface, cleaning liquid is supplied between the travel start position of the blade and the nozzle surface. The blade moves along the nozzle surface, retaining the cleaning liquid supplied.

A recording head for the ink jet recording apparatus has been proposed that includes a hollow receptacle for storing therein the cleaning liquid, and a dispensing port communicating with the receptacle, and through which the cleaning liquid is supplied between the travel start position of the blade and the nozzle surface. The cleaning liquid supplied to the receptacle from a cleaning liquid supply source through a supply port is downwardly protruding from the dispensing port, thus to be exposed therefrom, and retained in such a state. When the blade moves from the travel start position, the exposed cleaning liquid is scraped off by the blade and retained thereby. Then the nozzle surface is wiped by the blade with the cleaning liquid, so that the ink stuck to the nozzle surface is removed.

SUMMARY

The disclosure proposes further improvement of the foregoing techniques.

In an aspect, the disclosure provides an ink jet recording apparatus including a recording head, a blade, and a cleaning liquid dispensing unit. The recording head includes a nozzle surface including a plurality of nozzles each having an ink outlet oriented downward, and is supported so as to move in an up-down direction. The blade wipes the nozzle surface, by moving in a predetermined moving direction in contact with the nozzle surface. The cleaning liquid dispensing unit stores therein cleaning liquid supplied from a cleaning liquid supply source, and supplies the cleaning liquid between a travel start position of the blade and the nozzle surface. The cleaning liquid dispensing unit includes a receptacle in which the cleaning liquid that has been supplied is stored, the receptacle having a top face open upward.

DETAILED DESCRIPTION

Hereafter, an ink jet recording apparatus according to an embodiment of the disclosure will be described, with reference to the accompanying drawings.

Figure 1:
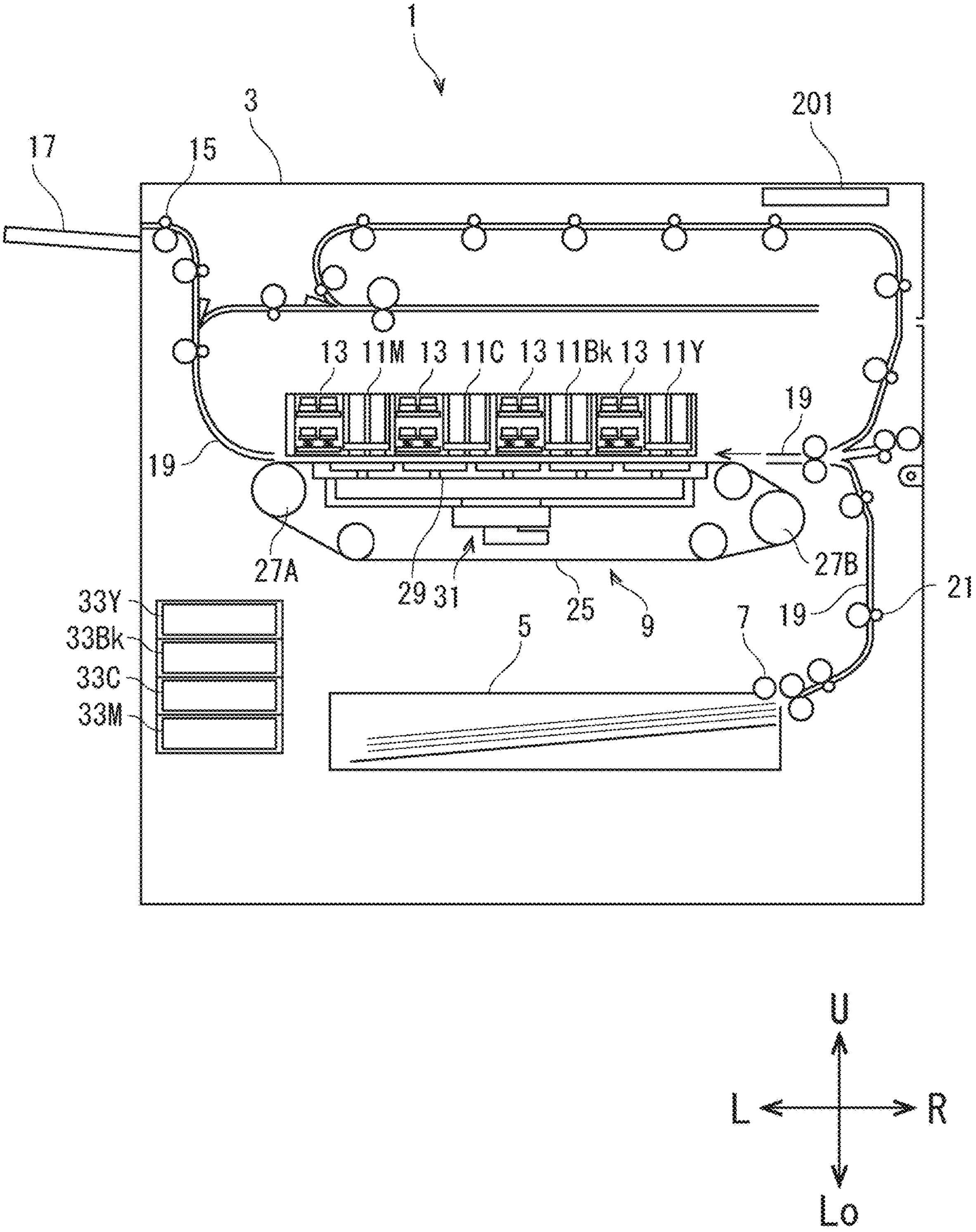
FIG. 1 is a schematic front view showing the internal structure of an ink jet recording apparatus according to an embodiment of the disclosure.
Figure 2A:
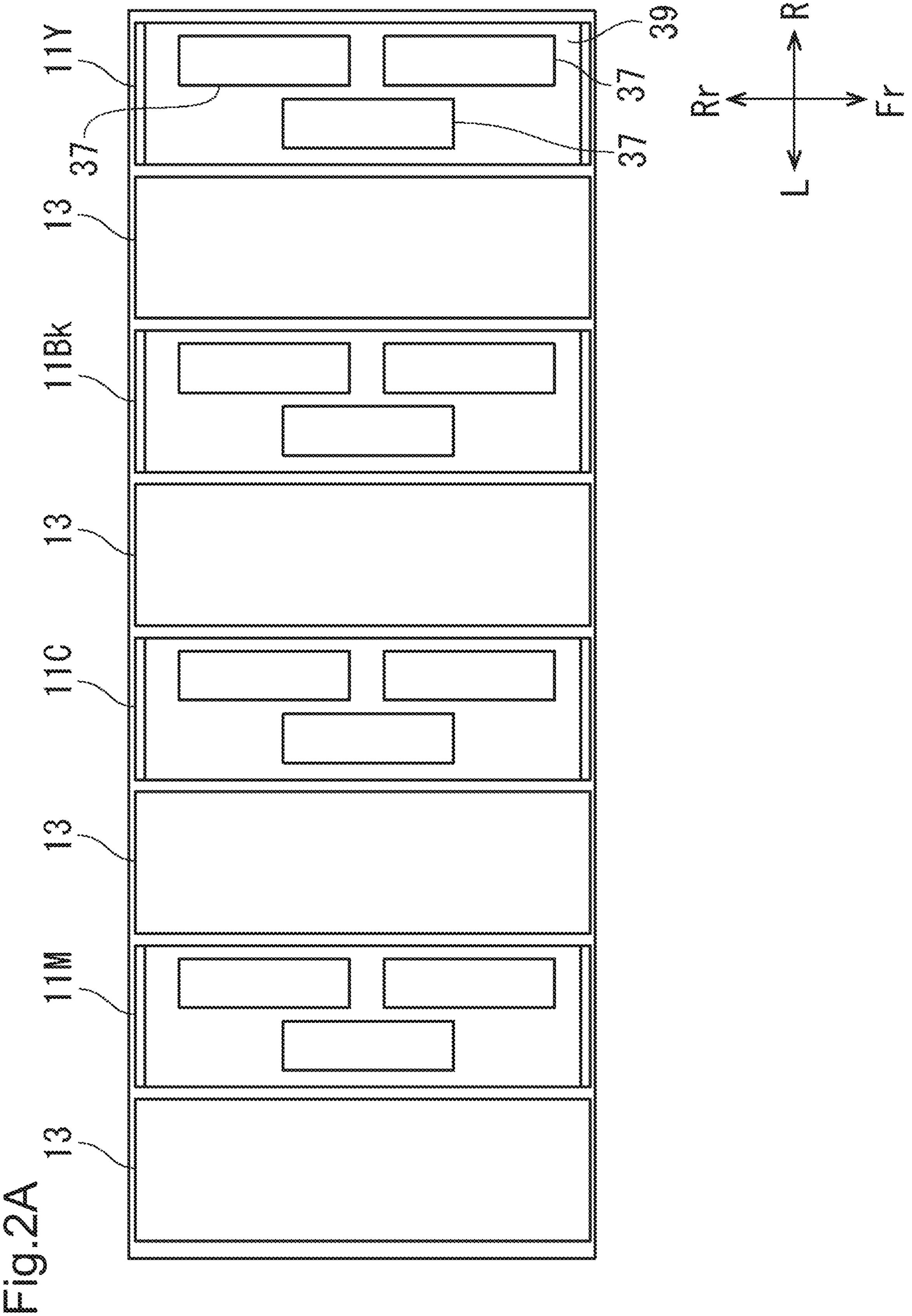
FIG. 2A is a schematic plan view showing a head unit and a maintenance unit of the ink jet recording apparatus according to the embodiment of the disclosure.
Figure 2B:
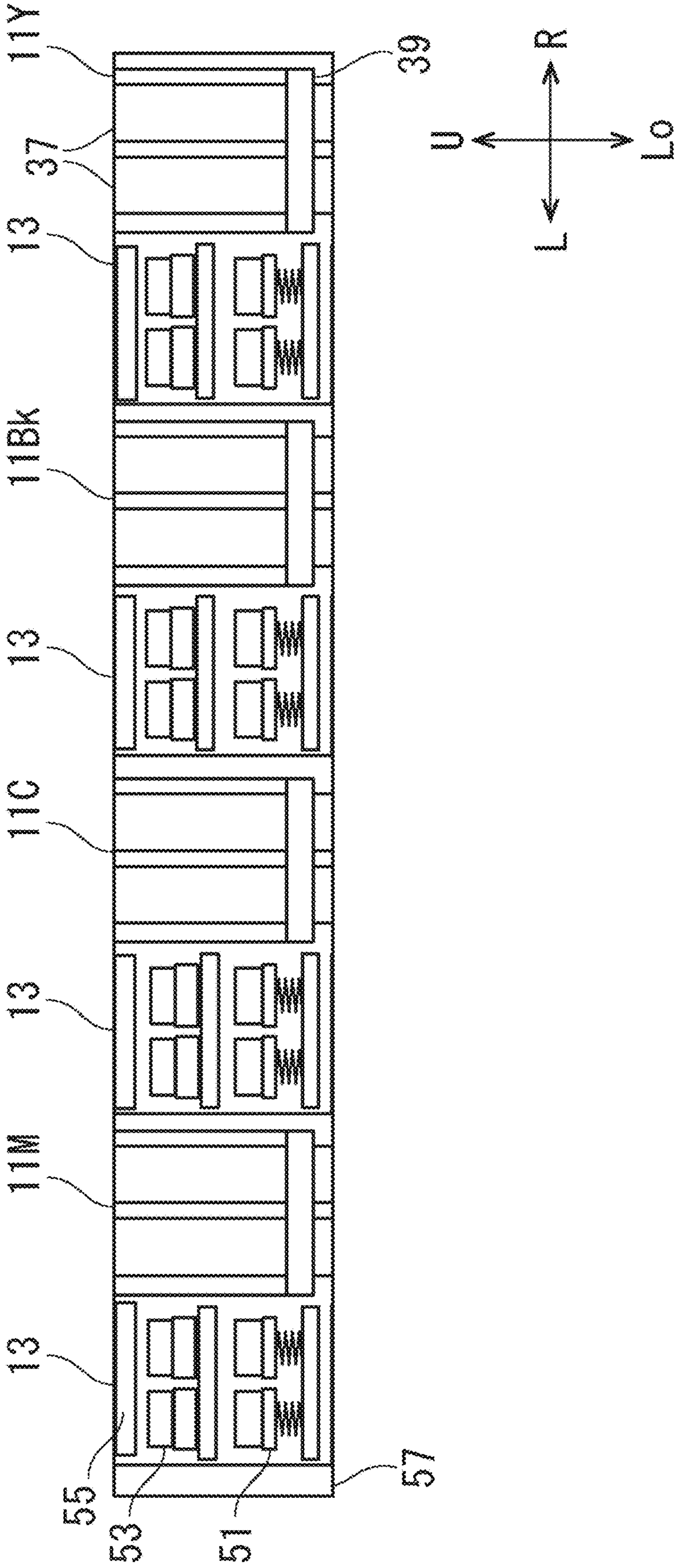
FIG. 2B is a schematic front view showing the head unit and the maintenance unit of the ink jet recording apparatus according to the embodiment of the disclosure.

Referring first to FIG. 1, FIG. 2A, and FIG. 2B, a general configuration of an ink jet recording apparatus 1 will be described. FIG. 1 is a schematic front view showing the internal structure of the ink jet recording apparatus 1. FIG. 2A is a schematic plan view showing a head unit 11 and a maintenance unit 13, and FIG. 2B is a schematic front view showing the head unit 11 and the maintenance unit 13. Hereinafter, the near side of the sheet of FIG. 1 will be defined as front (forward) side of the ink jet recording apparatus 1. In each drawing, reference codes U, Lo, L, R, Fr, and Rr indicate the upper, lower, left, right, front, and rear sides, respectively. Such upper, lower, left, right, front, and rear sides referred to in the subsequent description are merely for indicating the relation among the components in the corresponding drawing, and not intended to limit the position and orientation of the components provided in the ink jet recording apparatus 1, to the indicated directions.

As shown in FIG. 1, the ink jet recording apparatus 1 is configured as an ink jet image forming apparatus, which forms an image by ejecting ink. The ink jet recording apparatus 1 includes a main body housing 3 of a rectangular cuboid shape. In the lower portion inside the main body housing 3, a sheet cassette 5 in which sheets are stored, and a sheet feeding roller 7 for delivering the sheet from the sheet cassettes 5, are provided. On the upper side of the sheet cassette 5, a conveying unit 9 that conveys the sheet is provided. On the upper side of the conveying unit 9, four head units 11M, 11C, 11Bk, and 11Y (simply head unit 11, when collectively referred to) and four maintenance units 13 are provided (see also FIG. 2A and FIG. 2B). At the left upper position of the main body housing 3, a delivery roller pair 15 for delivering the sheet having an image formed thereon, and an output tray 17 for receiving the delivered sheet, are provided.

Inside the main body housing 3, a transport route 19, extending from the sheet cassette 5 to the delivery roller pair 15 via the conveying unit 9, is provided. Along the transport route 19, a plurality of transport roller pairs 21 for transporting the sheet are provided The conveying unit 9 will be described hereunder, with reference to FIG. 1. The conveying unit 9 includes an endless conveying belt 25. The conveying belt 25 includes a multitude of through holes, penetrating therethrough in the thickness direction. The conveying belt 25 is stretched around a drive roller 27A and a follower roller 27B, spaced from each other in the left-right direction. The drive roller 27A is driven to rotate by a non-illustrated motor. By the rotation of the drive roller 27A, the conveying belt 25 is made to run counterclockwise in FIG. 1. The portion of the conveying belt 25 running along the upper orbit constitutes a part of the transport route 19, on which the sheet is transported in a transport direction, from the right to the left in FIG. 1.

Inside the orbit of the conveying belt 25, a transport plate 29 and a suction device 31 are provided. The transport plate 29 includes a multitude of through holes, penetrating therethrough in the thickness direction. The transport plate 29 is located in contact with the inner surface of the conveying belt 25 running along the upper orbit. The suction device 31 is located on the lower side of the transport plate 29, and adsorbs the sheet to the conveying belt 25, by sucking air through the through holes of the conveying belt 25 and those of the transport plate 29.

The head unit 11 will now be described. The four head units 11Y, 11Bk, 11C, and 11M, respectively corresponding to the ink of yellow, black, cyan, and magenta, are aligned on the upper side of the conveying unit 9, at predetermined intervals along the transport direction. The four head units 11Y, 11Bk, 11C, 11M are respectively connected to ink containers 33Y, 33Bk, 33C, and 33M, containing the ink of yellow, black, cyan, and magenta. The head units 11 each include, as shown in FIG. 2A and FIG. 2B, three recording heads 37, and a plate 39 supporting the three recording heads 37.

Figure 3A:
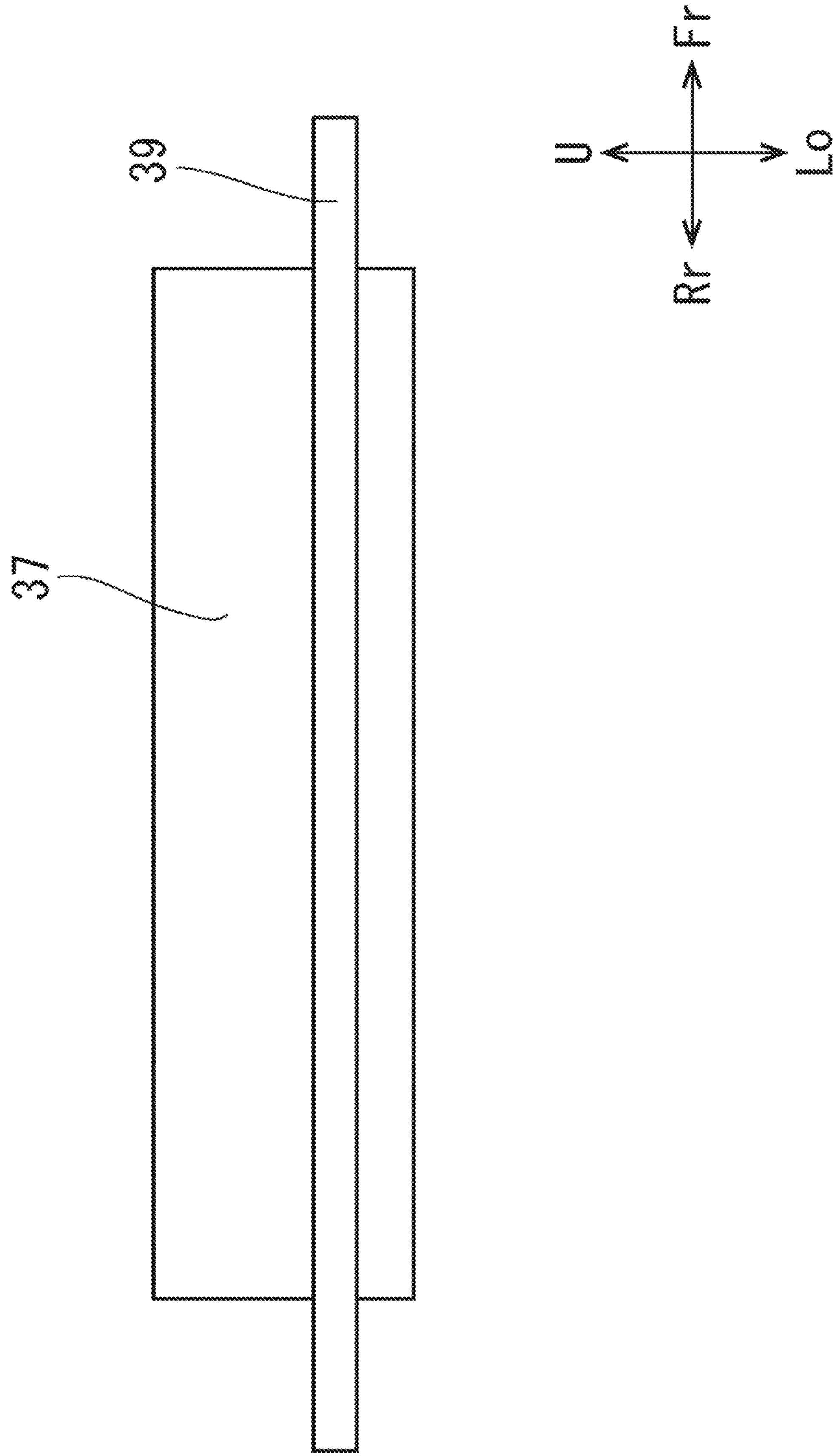
FIG. 3A is a side view showing a recording head of the ink jet recording apparatus according to the embodiment of the disclosure.
Figure 3B:
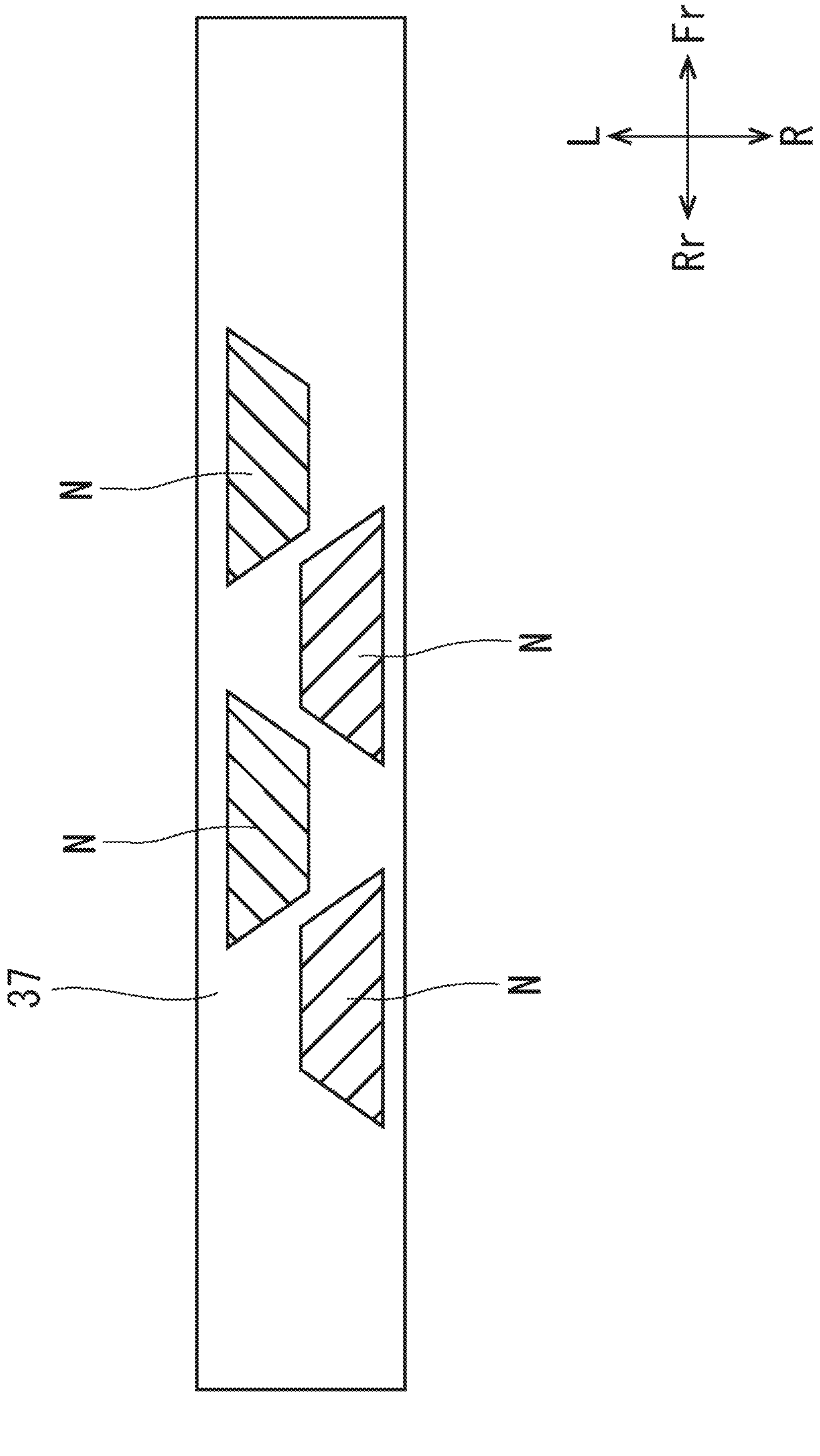
FIG. 3B is a bottom view showing the recording head of the ink jet recording apparatus according to the embodiment of the disclosure.

Referring now to FIG. 3A and FIG. 3B, the recording head 37 will be described. FIG. 3A is a side view showing the recording head 37, and FIG. 3B is a bottom view showing the recording head 37. The recording head 37 has a rectangular cuboid shape, elongate in the width direction (front-rear direction) intersecting the transport direction. The recording head 37 includes a multitude of non-illustrated nozzles, to which the ink is supplied, and non-illustrated piezoelectric elements provided in the respective nozzles. The ink outlet of each of the nozzles is open on the lower face of the recording head 37. When the piezoelectric element is driven, the ink inside the nozzle is ejected downward, through the ink outlet. Referring to FIG. 3B, the surface including a region N where the ink outlets are open will hereinafter be referred to as nozzle surface N.

The three recording heads 37 are, as shown in FIG. 2A, arranged along the width direction (front-rear direction), so as to be alternately shifted from each other in the left-right direction. To be more detailed, two recording heads 37 are aligned along the width direction, and one recording head 37 is located adjacent to the two recording heads 37, in the transport direction (left-right direction). The recording head 37 is, as shown in FIG. 3A, supported by the plate 39, with the lower end portion protruding therefrom.

The four head units 11 are each supported by a head unit elevation mechanism 41 (see FIG. 11; not shown in FIG. 1, FIG. 2A and FIG. 2B), so as to move up and downward between a printing position and a retracted position. The printing position refers to the position where the nozzle surface N of the recording head 37 of the head unit 11 is opposed to the conveying belt 25 running along the upper orbit, via a predetermined gap (e.g., 1 mm) (see FIG. 1). The retracted position refers to the position where the nozzle surface N of the recording head 37 of the head unit 11 is spaced from the conveying belt 25 to the upper side, so as to secure a space for accommodating a cap unit 51 and a wipe unit 53 of a maintenance unit 13, to be subsequently described, on the upper side of the conveying unit 9. The head unit elevation mechanism 41 is electrically connected to a controller 201 (see also FIG. 11).

Hereunder, the maintenance unit 13 will be described. The four maintenance units 13 all have the same structure, and respectively provided for the four head units 11. The maintenance unit 13 is located adjacent to the corresponding head unit 11, in the transport direction. In this embodiment, the maintenance unit 13 is located downstream (on the left side) of the corresponding head unit 11.

As shown in FIG. 2B, the maintenance units 13 each include a cap unit 51 covering the nozzle surface N of the three recording heads 37 of the head unit 11, a wipe unit 53 that cleans the nozzle surface N of the three recording heads 37 of the head unit 11, and a cleaning liquid supply unit 55 that supplies the cleaning liquid to the wipe unit 53.

The cap unit 51, the wipe unit 53, and the cleaning liquid supply unit 55 are supported by a housing 57. The housing 57 is formed in a hollow rectangular cuboid shape, elongate in the width direction, and open toward the corresponding head unit 11 (toward the right side).

Figure 4:
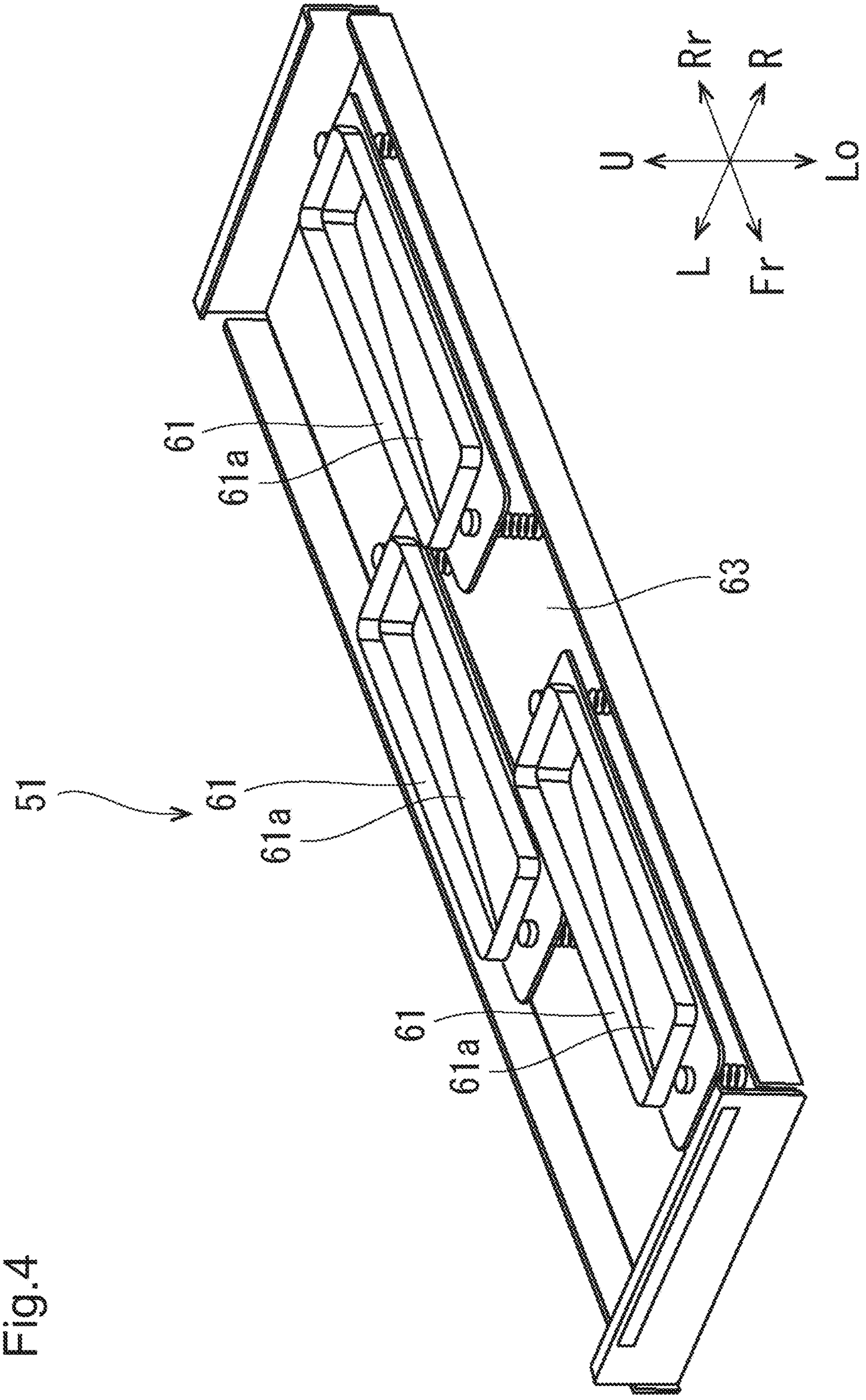
FIG. 4 is a perspective view showing a cap unit of the ink jet recording apparatus according to the embodiment of the disclosure.

Referring to FIG. 4, the cap unit 51 will be described. FIG. 4 is a perspective view showing the cap unit 51. The cap unit 51 includes three caps 61, respectively covering the nozzle surface N of the three recording heads 37. The three caps 61 are located so as to respectively correspond to the three recording heads 37 of the head unit 11, and supported by a support plate 63. The caps 61 each include a recessed portion 61*a* having an opening oriented upward, and a non-illustrated discharge port provided on the bottom portion of the recessed portion 61*a*.

The cap unit 51 can be moved, by a non-illustrated cap unit moving mechanism, between the standby position (see FIG. 1, FIG. 2A, and FIG. 2B) and the covering position, in the transport direction and opposite thereto (left-right direction). The standby position refers to the position where the cap unit 51 is accommodated in the lower space of the housing 57. The covering position refers to the position where the cap unit 51 is accommodated in the space on the lower side of the head unit 11 located at the retracted position. When the cap unit 51 is located at the covering position, and the head unit 11 moves downward to a predetermined height, the three caps 61 respectively covers the nozzle surface N of the three recording heads 37. The cap unit 51 is movable between the covering position and the standby position, through the opening of the housing 57 on the right side.

Figure 5:
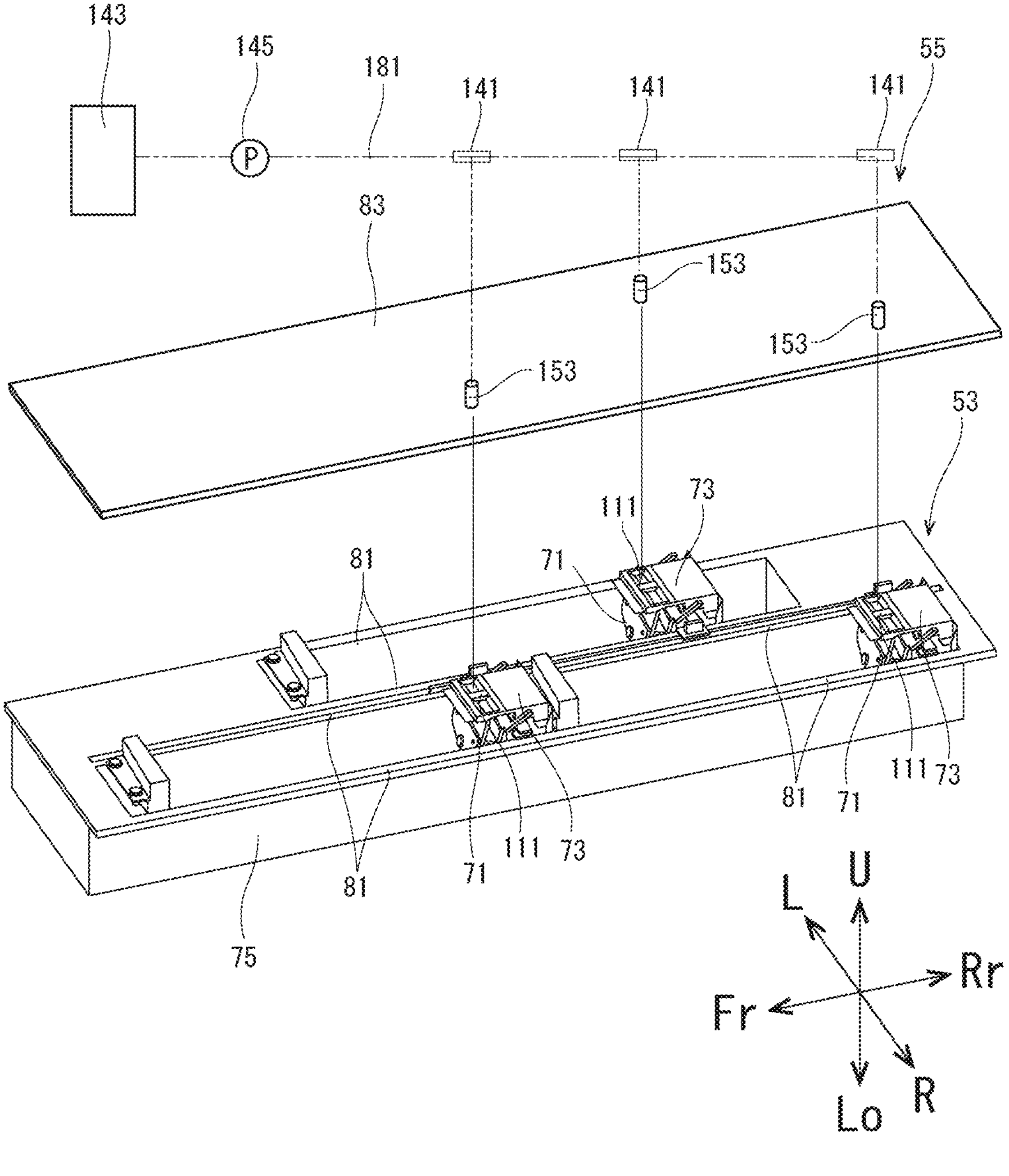
FIG. 5 is an exploded perspective view showing a wipe unit and a cleaning liquid supply unit of the ink jet recording apparatus according to the embodiment of the disclosure.

Proceeding to FIG. 5, the wipe unit 53 will be described. FIG. 5 is an exploded perspective view showing the wipe unit 53 and the cleaning liquid supply unit 55. The wipe unit 53 includes three carriages 71, three cleaning liquid dispensing units 73, and a waste liquid tray 75 supporting the three carriages 71 and the three cleaning liquid dispensing units 73.

First, the waste liquid tray 75 will be described. The waste liquid tray 75 is formed in a box shape with an opening oriented upward, and in a size that accords with the head unit 11. The waste liquid tray 75 includes three rails 81 extending in the width direction (front-rear direction). The three rails 81 are located so as to respectively correspond to the three recording heads 37 of the head unit 11.

The upper face of the waste liquid tray 75, which is open upward, can be closed by a waste liquid tray cover 83. The waste liquid tray cover 83 is supported by the housing 57, so as to be moved in the up-down direction, by a waste liquid tray cover elevation mechanism 85 (see FIG. 11; not shown in FIG. 5). The waste liquid tray cover 83 is moved by the waste liquid tray cover elevation mechanism 85, between the position for covering the upper face of the waste liquid tray 75, and the position on the upper side of the upper face of the waste liquid tray 75. The waste liquid tray cover elevation mechanism 85 is electrically connected to the controller 201 (see FIG. 11). Further detail of the waste liquid tray cover 83 will be subsequently described.

Figure 6:
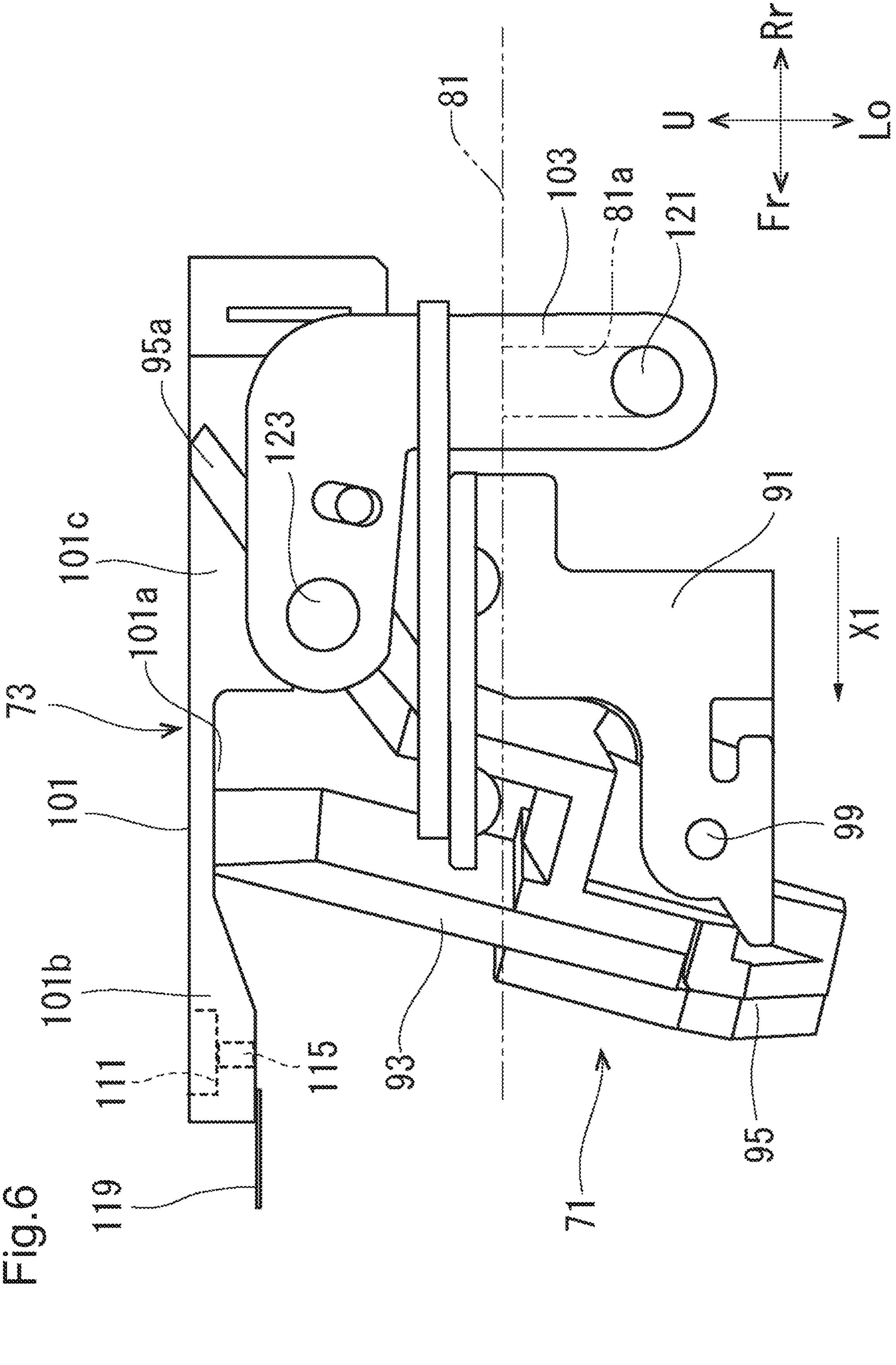
FIG. 6 is a side view showing a carriage and a cleaning liquid dispensing unit of a wipe unit of the ink jet recording apparatus according to the embodiment of the disclosure.
Figure 7:
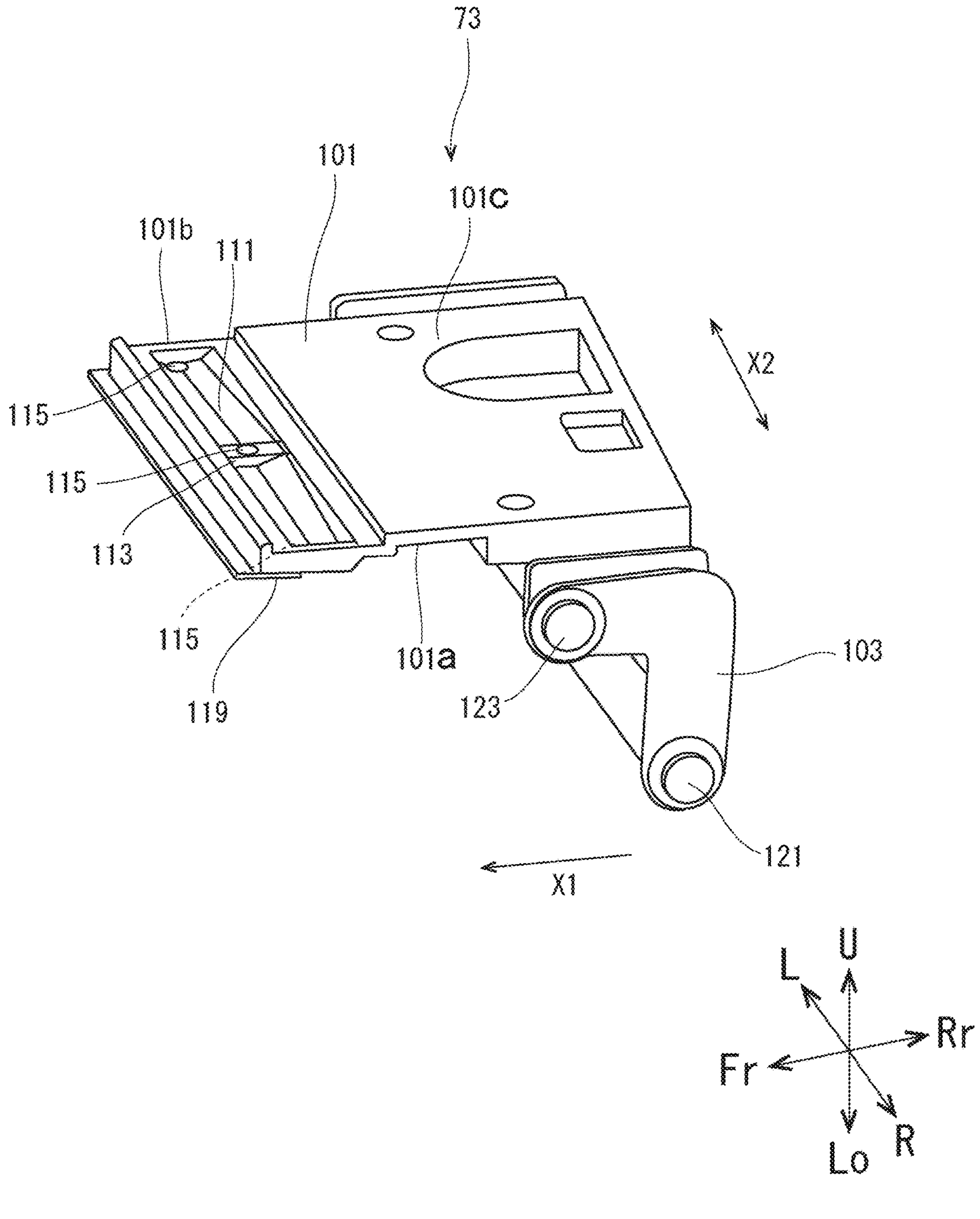
FIG. 7 is a perspective view showing the cleaning liquid dispensing unit of the wipe unit of the ink jet recording apparatus according to the embodiment of the disclosure.

Hereunder, the carriage 71 and the cleaning liquid dispensing unit 73 will be described, with reference to FIG. 6 and FIG. 7. FIG. 6 is a side view showing the carriage 73 and the cleaning liquid dispensing unit 73, and FIG. 7 is a perspective view showing the cleaning liquid dispensing unit 73.

Referring to FIG. 6, the carriage 71 will be described. The carriage 71 includes a slider 91, a blade 93, and a holder 95 supporting the blade 93 and supported by the slider 91.

The slider 91 is engaged with the rail 81 provided on the waste liquid tray 75, so as to be moved by a carriage moving mechanism 97 (see FIG. 11; not shown in FIG. 6), between the front end portion and the rear end portion of the rail 81. In this embodiment, the slider 91 moves from the rear end portion (travel start position) to the front end portion (travel finish position) of the rail 81, to clean the nozzle surface N of the recording heads 37. The direction from the travel start position toward the travel finish position (in this embodiment, from the rear end to the front end) will be defined as moving direction X1 of the slider 91 (carriage 71). The carriage moving mechanism 97 is electrically connected to the controller 201 (see FIG. 11).

The blade 93 is a plate-shaped member wider than the nozzle surface N, and formed of a flexible resin. The blade 93 has the lower end portion supported by the holder 95, in a posture inclined toward the upstream side in the moving direction X1, and inclined with respect to a blade width direction X2 (left-right direction) intersecting the moving direction X1. The lower end portion of the holder 95 is supported by the slider 91, at the position upstream of the blade 93 in the moving direction X1, so as to pivot about a pivotal shaft 99. Accordingly, the blade 93 can be made to pivot by the holder 95 about the pivotal shaft 99, to the upstream side and the downstream side in the moving direction X1. The holder 95 includes a pair of arms 95*a*, extending upward from the respective sides in the blade width direction X2.

Hereunder, the cleaning liquid dispensing unit 73 will be described, with reference to FIG. 6 and FIG. 7. The cleaning liquid dispensing unit 73, formed independently from the carriage 71, includes a cleaning liquid carrier 101, and a pair of holders 103 supporting the cleaning liquid carrier 101 and supported by the rail 81.

First, the cleaning liquid carrier 101 will be described. The cleaning liquid carrier 101 is formed in a rectangular plate shape, having a flat upper face. As shown in FIG. 6, the cleaning liquid carrier 101 includes a recessed portion 101*a* formed on the lower face and extending in the blade width direction X2. The side face of the recessed portion 101*a* on the downstream side in the moving direction X1 is inclined toward the downstream side in the moving direction X1. The cleaning liquid carrier 101 includes a distal end portion 101*b* formed downstream of the recessed portion 101*a* in the moving direction X1, and a basal portion 101*c* on the upstream side. The distal end portion 101*b* is thinner than the basal portion 101*c*. The lower face of the distal end portion 101*b* is formed as a flat surface slightly inclined upward, toward the downstream side in the moving direction X1.

As shown in FIG. 7, a receptacle 111 for accommodating the cleaning liquid is formed on the upper face of the distal end portion 101*b*. The receptacle 111 has a rectangular shape, elongate in the blade width direction X2 and short in the moving direction X1, in a plan view, and is formed as a recess surrounded by the bottom face, a pair of short side faces opposed to each other in the blade width direction X2, and a pair of long side faces opposed to each other in the moving direction X1, and having an opening oriented upward. At the central position of the bottom face in the blade width direction X2, an elevated portion 113 is formed. The elevated portion 113 includes a flat summit slightly lower than the upper face of the distal end portion 101*b*, and side faces inclined downward from the summit toward the bottom face. In addition, the pair of long side faces of the elevated portion 113 are inclined toward the bottom face, in a valley-like shape.

As shown in FIG. 6 and FIG. 7, a plurality of (in this embodiment, three) dispensing ports 115 are formed in the receptacle 111, at predetermined intervals in the blade width direction X2. The central dispensing port 115 is formed so as to penetrate through the elevated portion 113 in the up-down direction. The remaining two dispensing ports 115 are formed so as to penetrate in the up-down direction, from the bottom face of the receptacle 111 to the lower face of the distal end portion 101*b*, on the respective sides of the central dispensing port 115.

To the lower face of the distal end portion 101*b*, a rectangular sheet 119 is stuck, so as to protrude toward the downstream side in the moving direction X1. The sheet 119 extends toward the downstream side (to the front side) in the moving direction X1, along a plane generally flush with the lower face of the distal end portion 101*b*. The sheet 119 is stuck to a position downstream of the dispensing port 115, in the moving direction X1.

Hereunder, the pair of holders 103 will be described. Each of the pair of holders 103 is a plate material formed in an L-shape in a side view. A support shaft 121 is provided at an end portion of the holder 103. The support shaft 121 is, as shown in FIG. 6, fitted in a cutaway portion 81*a* of the rail 81, at a position upstream of the travel start position of the carriage 71, in the moving direction X1. At the other end portion of the holder 103, the basal portion 101*c* of the cleaning liquid carrier 101 is supported so as to pivot about a pivotal shaft 123.

Figure 8A:
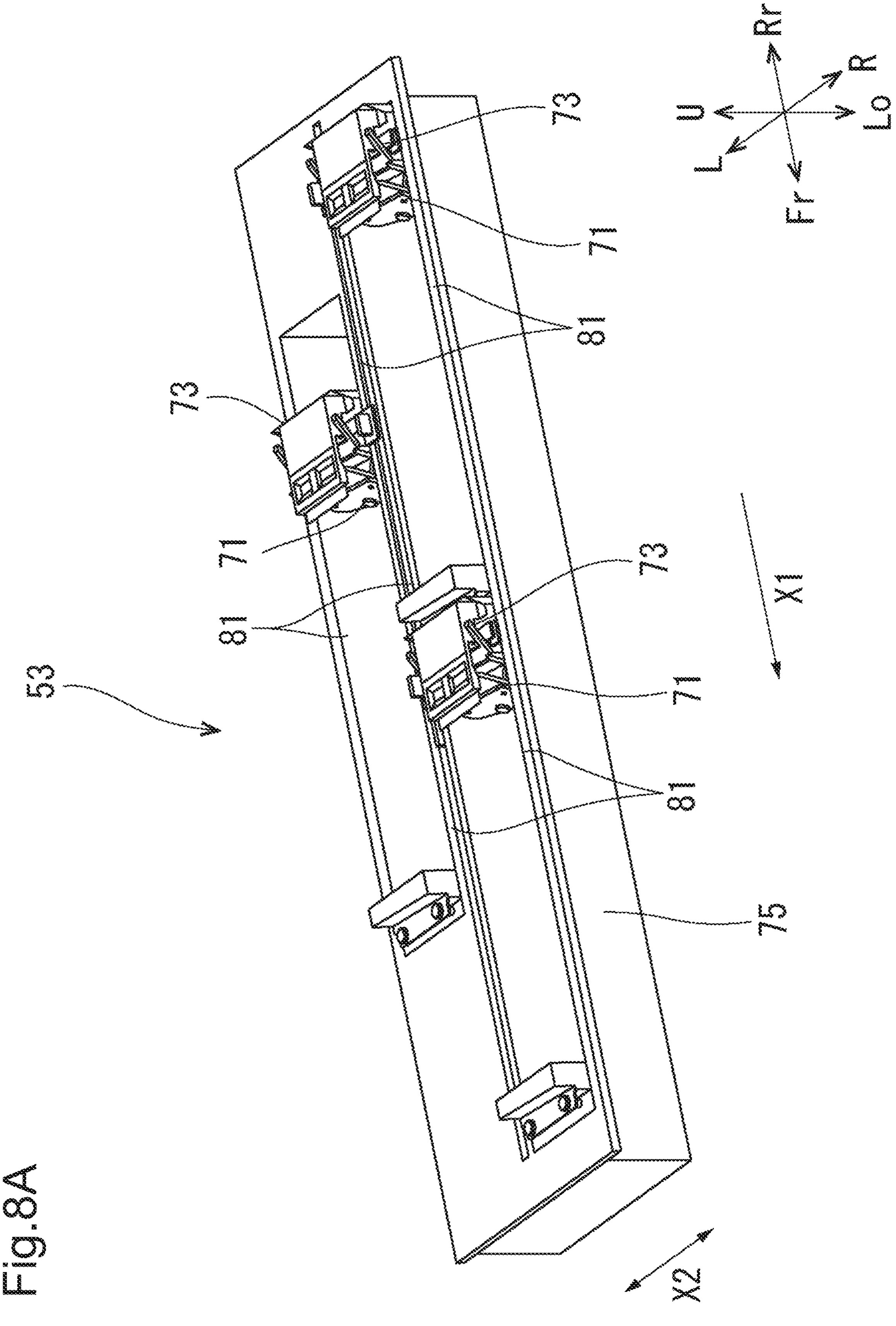
FIG. 8A is a perspective view showing the carriage located at a travel start position, in the wipe unit of the ink jet recording apparatus according to the embodiment of the disclosure.
Figure 8B:
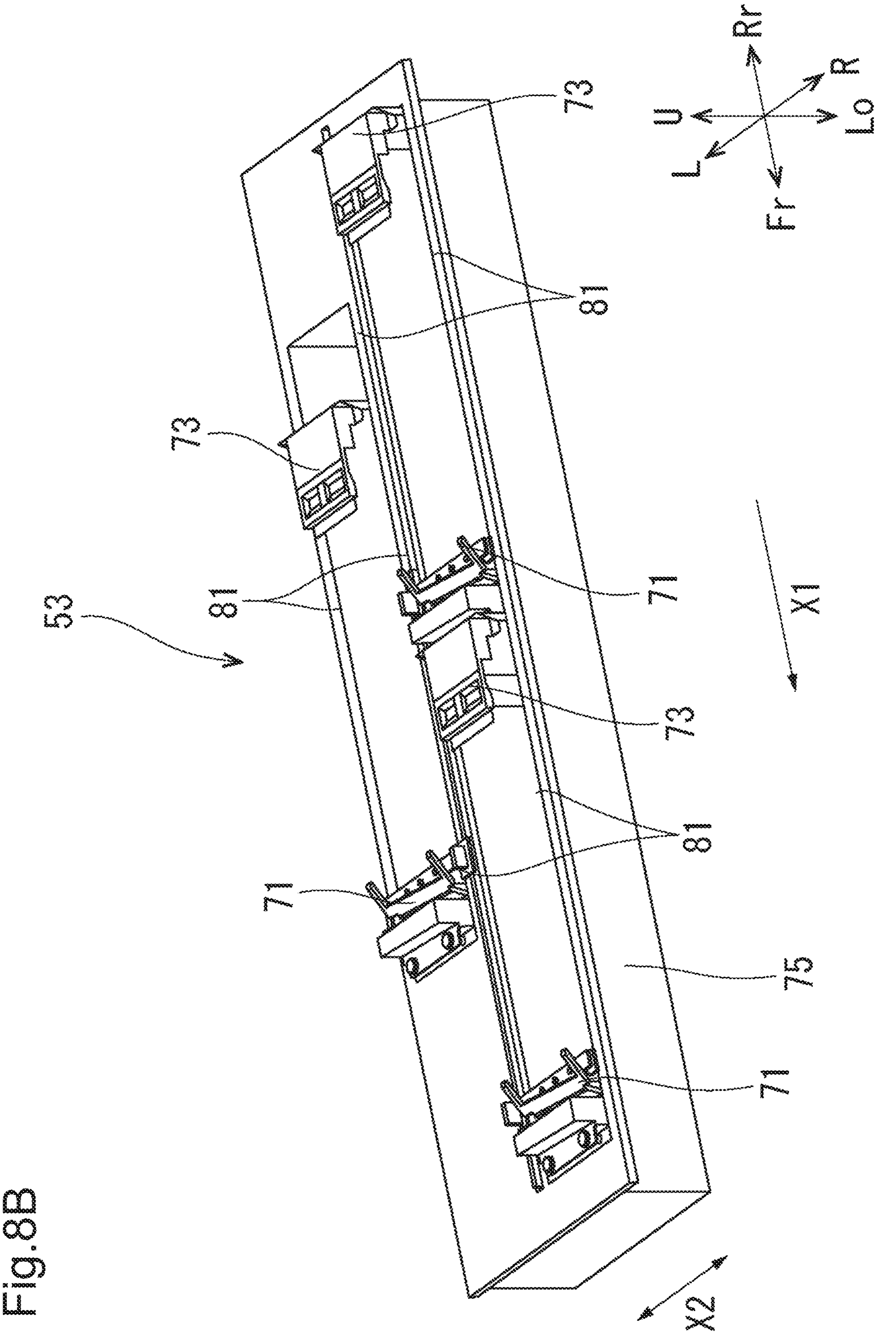
FIG. 8B is a perspective view showing the carriage located at a travel finish position, in the wipe unit of the ink jet recording apparatus according to the embodiment of the disclosure.

Referring now to FIG. 8A and FIG. 8B, the movement of the carriage 71 will be described. FIG. 8A illustrates the carriage 71 located at the travel start position, and FIG. 8B illustrates the carriage 71 located at the travel finish position.

When the carriage 71 is located at the travel start position (see FIG. 8A), the distal end portion of the blade 93 is accommodated in the recessed portion 101*a* of the cleaning liquid carrier 101 (see FIG. 6). The carriage 71 is moved by the carriage moving mechanism 97 (see FIG. 11) from the travel start position (see FIG. 8A) to the travel finish position (see FIG. 8B). Here, since the cleaning liquid dispensing unit 73 is immovably supported by the rail 81 of the waste liquid tray 75 as described above, and therefore the cleaning liquid dispensing unit 73 is restricted from moving, regardless that the carriage 71 moves.

Hereunder, the movement of the wipe unit 53 will be described. The wipe unit 53 (carriage 71, cleaning liquid dispensing unit 73, and waste liquid tray 75) can be moved by the wipe unit moving mechanism 131 (see FIG. 11) in the transport direction and opposite thereto (left-right direction), between the standby position (see FIG. 2B) and the wiping position. At the standby position, the wipe unit 53 is accommodated in the upper space of the housing 57. At the wiping position, the wipe unit 53 is accommodated in the space on the lower side of the head unit 11 lifted up to the retracted position. When the wipe unit 53 is located at the wiping position after the head unit 11 is set at the retracted position, and then the head unit 11 is moved downward to the predetermined height, the blade 93 can be brought into contact with the nozzle surface N of the recording head 37. The wipe unit 53 can move between the standby position and the wiping position, through the opening of the housing 57 on the right side. The wipe unit moving mechanism 131 is electrically connected to the controller 201 (see FIG. 11).

In addition, when the wipe unit 53 thus moves between the standby position and the wiping position, the cleaning liquid dispensing unit 73 provided in the wipe unit 53 moves between a supply position where the cleaning liquid is supplied from the cleaning liquid supply unit 55, and a dispensing position where the cleaning liquid supplied as above can be applied to the nozzle surface N of the recording head 37.

Figure 9:
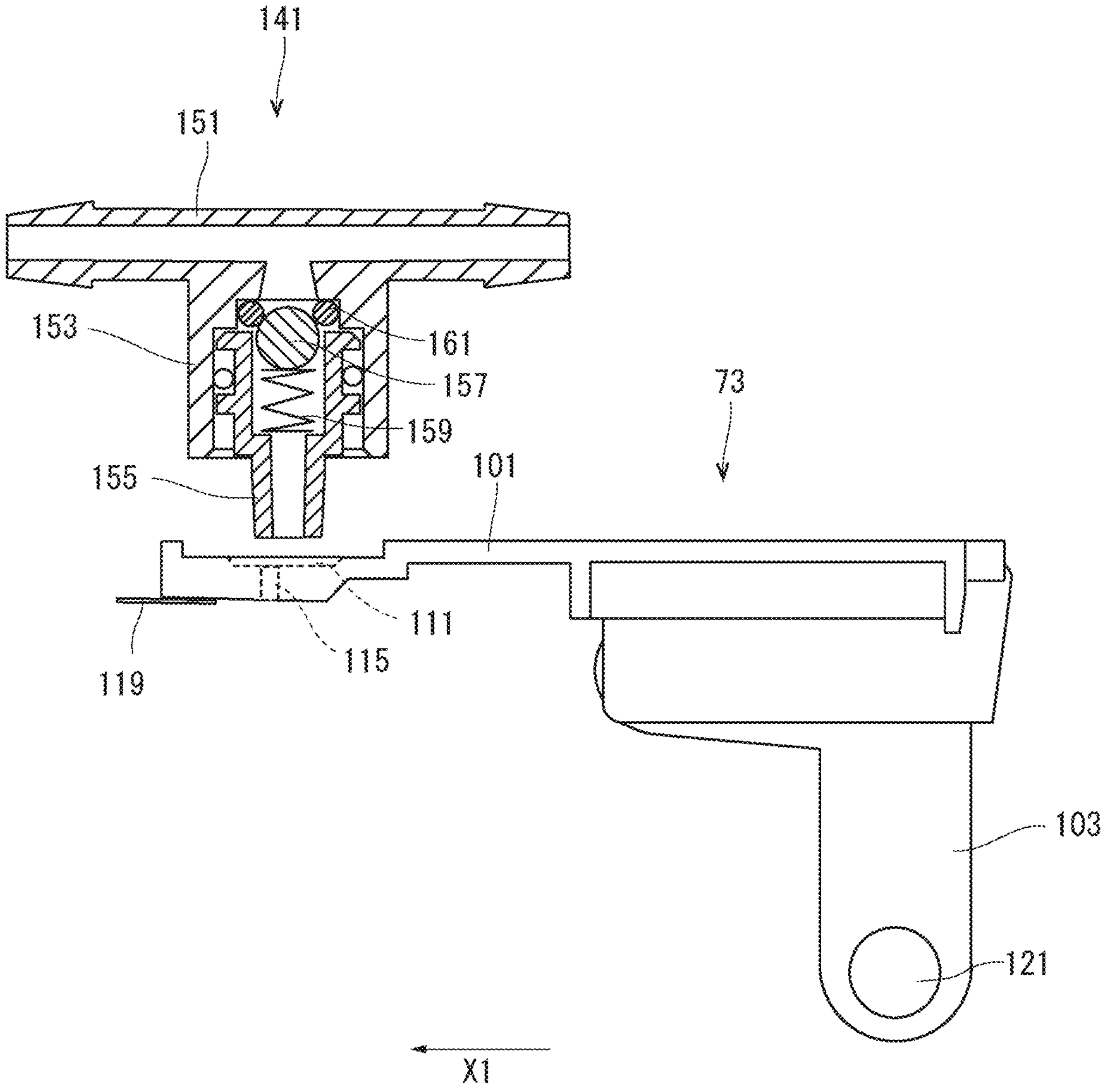
FIG. 9 is a cross-sectional view showing a supply pipe of the cleaning liquid supply unit, in the wipe unit of the ink jet recording apparatus according to the embodiment of the disclosure.
Figure 10:
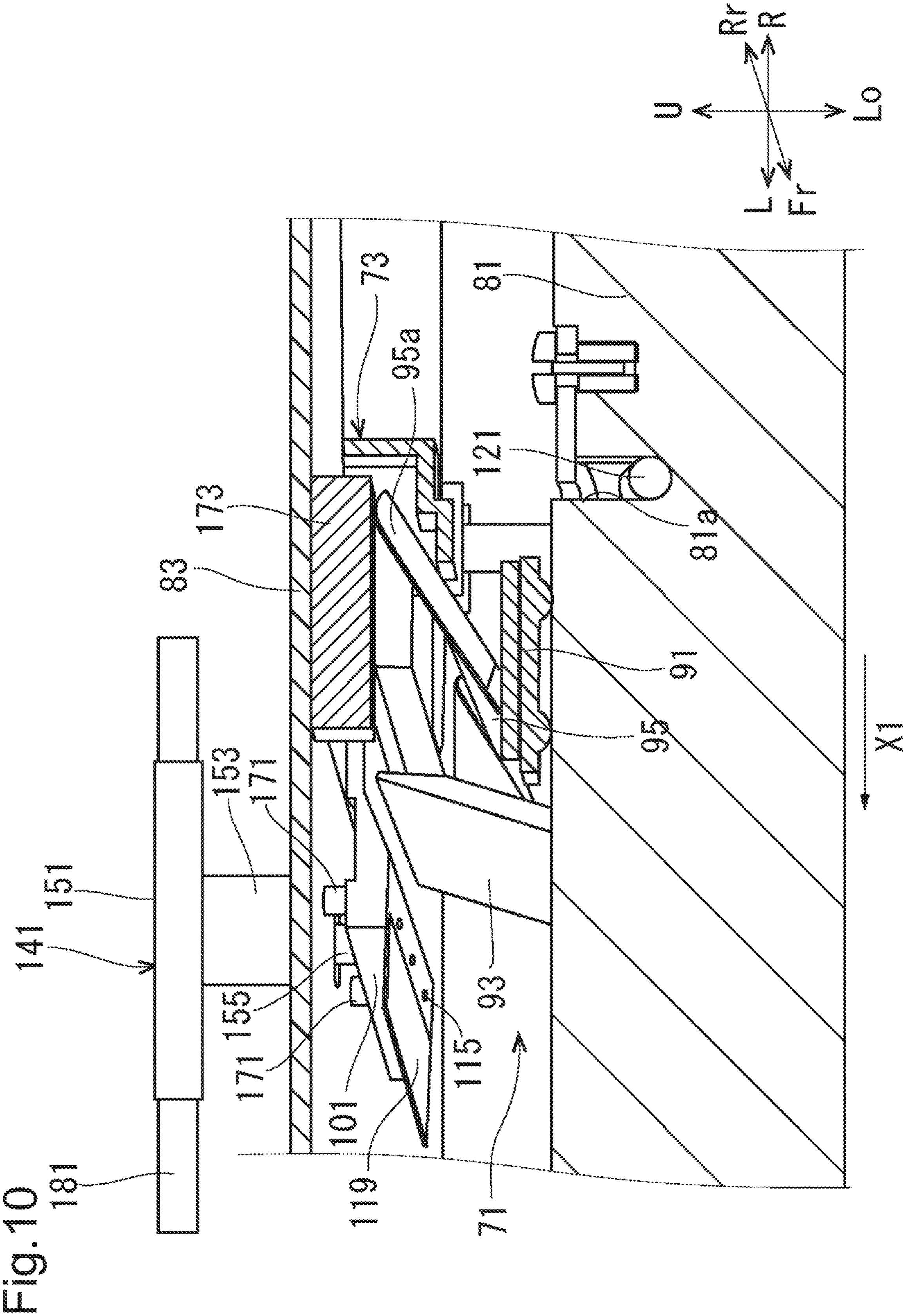
FIG. 10 is a perspective view showing the carriage and the cleaning liquid dispensing unit, performing the cleaning liquid supply operation, in the wipe unit of the ink jet recording apparatus according to the embodiment of the disclosure.

Hereunder, the cleaning liquid supply unit 55 will be described with reference to FIG. 5, FIG. 9, and FIG. 10. FIG. 9 is a cross-sectional view showing the supply pipe 141, and FIG. 10 is a perspective view showing the carriage 71 and the cleaning liquid dispensing unit 73, performing the cleaning liquid supply operation.

The cleaning liquid supply unit 55 is provided in the housing 57 (see FIG. 2B), to supply the cleaning liquid to the three cleaning liquid dispensing unit 73 of the wipe unit 53. As shown in FIG. 5, the cleaning liquid supply unit 55 includes three supply pipes 141, a cleaning liquid tank 143, and a pump 145.

First, the three supply pipes 141 will be described, with reference to FIG. 9. The supply pipes 141 each include a connection pipe 151 extending in the horizontal direction, and a branch pipe 153 of a circular cylindrical shape, branched from halfway of the connection pipe 151. In the hollow portion of the branch pipe 153, a nozzle 155 accommodated so as to move in the up-down direction. The nozzle 155 includes therein a spherical check valve 157. The check valve 157 is biased by a coil spring 159, toward the bottom face (upper side) of the branch pipe 153. On the bottom face of the branch pipe 153, an O-ring 161 is provided. The check valve 157 is in close contact with the O-ring 161, because of the biasing force of the coil spring 159. Thus, the nozzle 155 is closed by the check valve 157.

As shown in FIG. 5, the three supply pipes 141 are located so as to respectively correspond to the receptacle 111 of the three cleaning liquid dispensing unit 73 of the wipe unit 53 located at the standby position, and the branch pipe 153 is supported by the waste liquid tray cover 83. When the waste liquid tray cover 83 is moved by the waste liquid tray cover elevation mechanism 85 (see FIG. 11) in the up-down direction, the three supply pipes 141 also move in the up-down direction, together with the waste liquid tray cover 83. When the waste liquid tray cover 83 is moved downward, the respective nozzles 155 of the three supply pipes 141 are moved to the position right above the receptacle 111.

As shown in FIG. 10, a pair of positioning pins 171 are formed on the lower face of the waste liquid tray cover 83, on the respective sides of the branch pipe 153 in the blade width direction X2. In addition, a pair of rectangular cuboid protrusions 173 are formed on the lower face of the waste liquid tray cover 83, at a position upstream of the branch pipe 153 in the moving direction X1, with a spacing from each other in the blade width direction X2.

Referring again to FIG. 5, the cleaning liquid tank 143 will be described. In the cleaning liquid tank 143, the cleaning liquid is stored. The cleaning liquid is formed by removing color materials from the ink, and predominantly composed of a solvent and water. A surfactant or an antiseptic agent may be added, if need be. A piping 181 is connected to the outlet of the cleaning liquid tank 143. The respective connection pipes 151 of the three supply pipes 141 are connected to positions halfway of the piping 181. The cleaning liquid tank 143 exemplifies the cleaning liquid supply source in the disclosure.

The pump 145 is configured as follows. The pump 145 is provided on the piping 181, and serves to take up the cleaning liquid from the cleaning liquid tank 143, to the piping 181.

Figure 11:
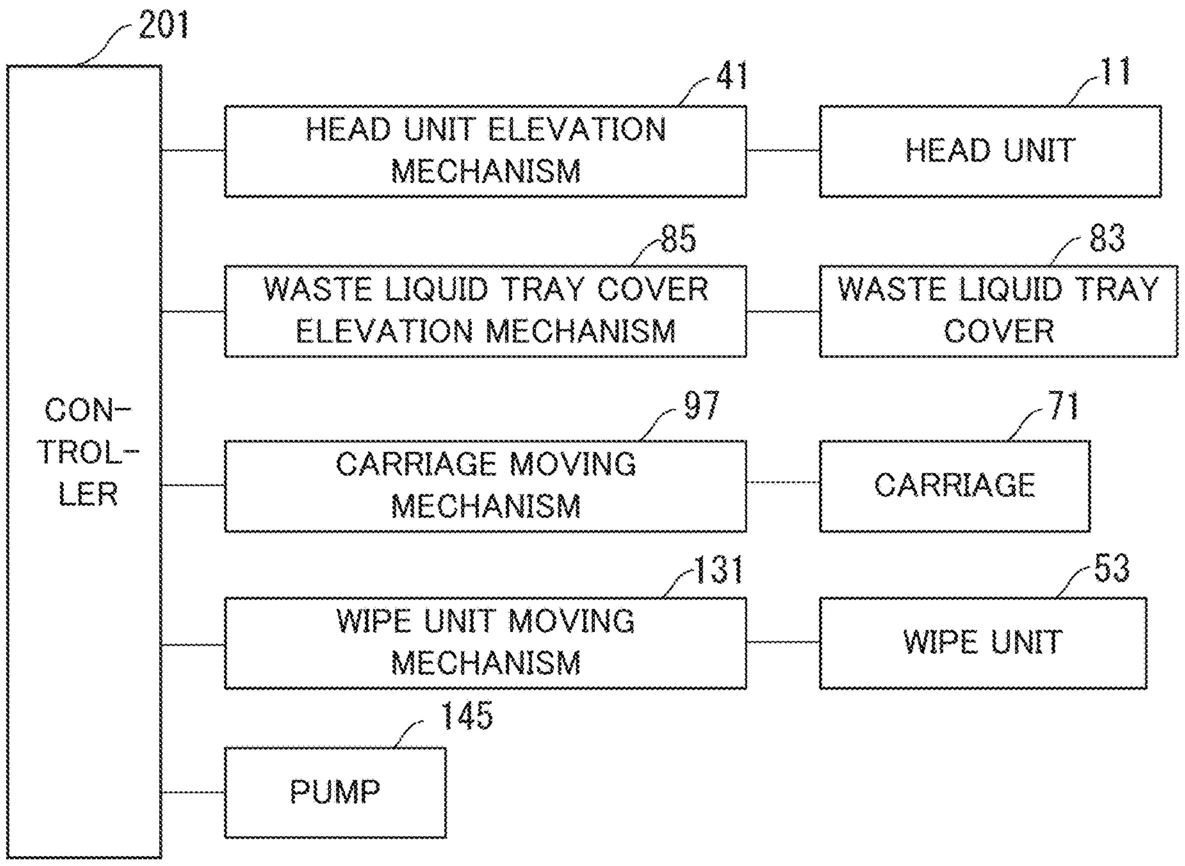
FIG. 11 is a block diagram showing a controller and related components, of the ink jet recording apparatus according to the embodiment of the disclosure.

Referring now to the block diagram in FIG. 11, the controller 201 will be described hereunder. The controller 201 operates the head unit elevation mechanism 41, so as to move the head unit 11 in the up-down direction, to a plurality of positions including the printing position, the retracted position, and the cleaning position between the printing position and the retracted position. The controller 201 operates the waste liquid tray cover elevation mechanism 85, so as to move the waste liquid tray cover 83 in the up-down direction between the separated position and the covering position. The controller 201 also operates the carriage moving mechanism 97, so as to move the carriage 71 between the travel start position and the travel finish position. In addition, the controller 201 operates the wipe unit moving mechanism 131, so as to move the wipe unit 53 between the wiping position and the standby position. Further, the controller 201 operates the pump 145, so as to start and stop taking up the cleaning liquid from the cleaning liquid tank 143, to the piping 181.

Figure 12:
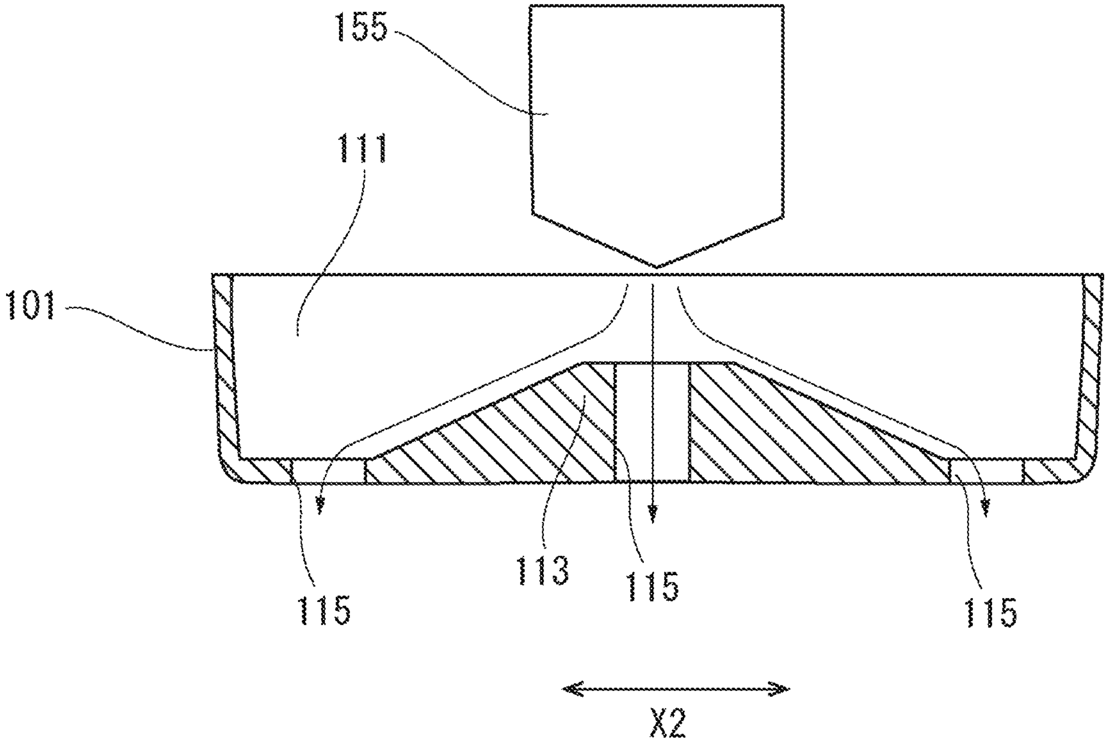
FIG. 12 is a schematic cross-sectional view showing how the cleaning liquid is supplied from the supply pipe to the cleaning liquid carrier, in the ink jet recording apparatus according to the embodiment of the disclosure.
Figure 13A:
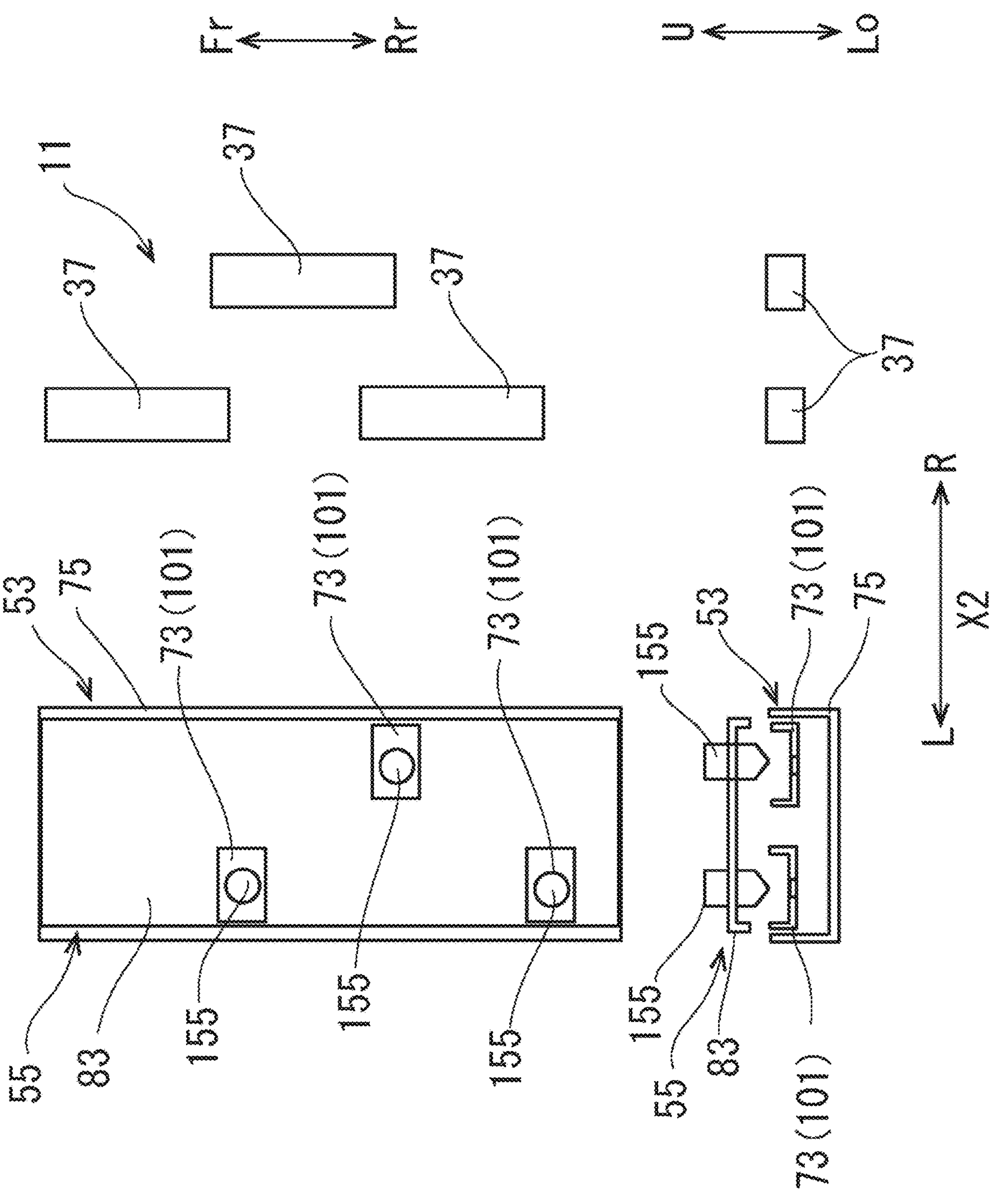
FIG. 13A includes a plan view and a front view showing the wipe unit located at a standby position, the cleaning liquid supply unit, and the recording head, in the ink jet recording apparatus according to the embodiment of the disclosure.
Figure 13B:
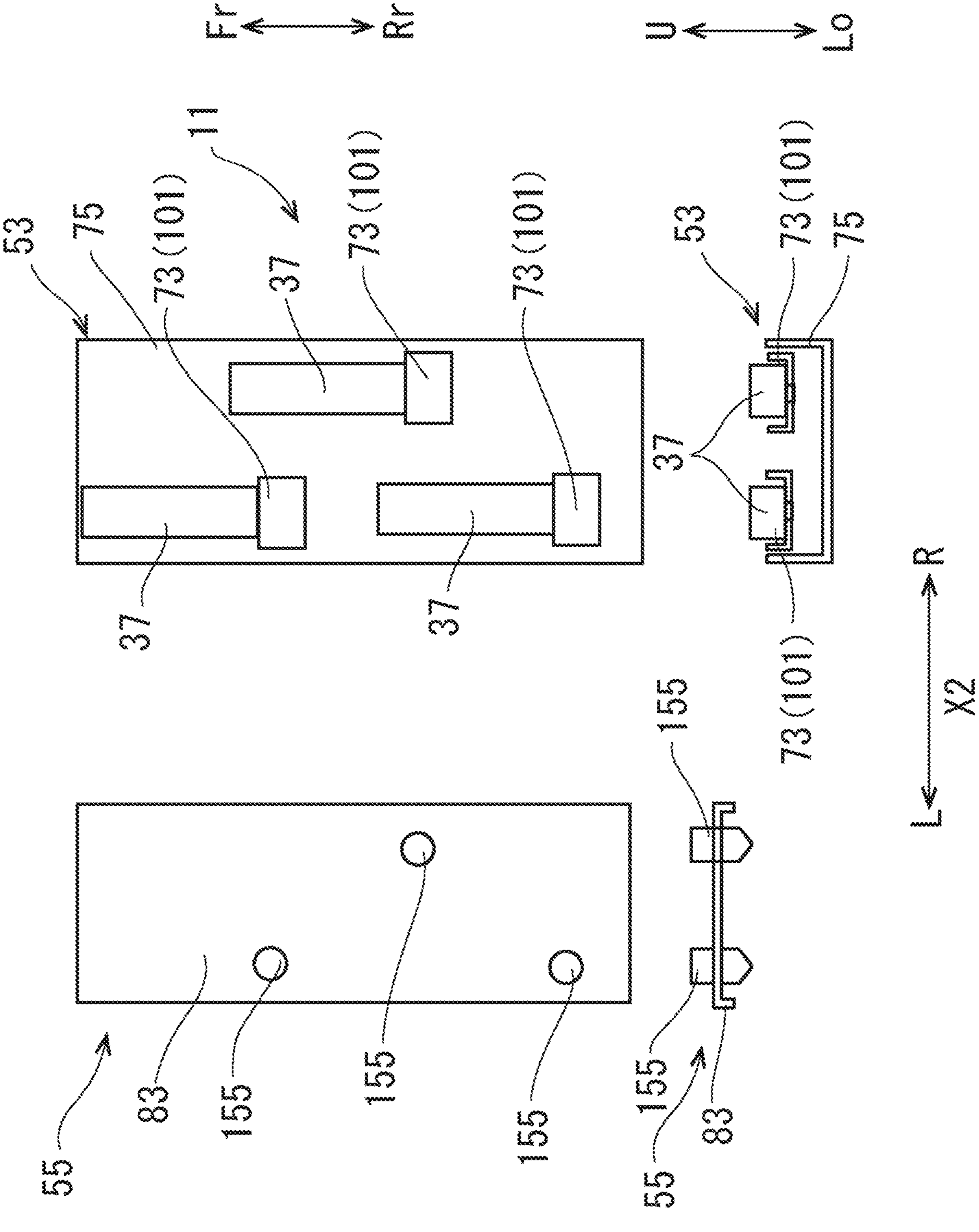
FIG. 13B includes a plan view and a front view showing the wipe unit located at a wiping position, the cleaning liquid supply unit, and the recording head, in the ink jet recording apparatus according to the embodiment of the disclosure.

Hereunder, the printing operation and the head cleaning operation, performed by the ink jet recording apparatus 1 configured as above, will be described with reference to FIG. 12, FIG. 13A, and FIG. 13B. FIG. 12 is a schematic cross-sectional view showing how the cleaning liquid is supplied from the supply pipe 141 to the receptacle 111. FIG. 13A and FIG. 13B each include a plan view and a front view, showing the wipe unit 53, the cleaning liquid supply unit 55, and the recording head 37.

First, the operation performed by the maintenance unit 13 when the printing operation is executed will be described. When the printing operation is executed, the cap unit 51 and the wipe unit 53 are located at the standby position. In other words, as shown in FIG. 13A, the cleaning liquid dispensing unit 73 provided in the wipe unit 53 is located at the supply position. To be more detailed, as shown in FIG. 10, the waste liquid tray cover 83 is lowered, and the pair of positioning pins 171 are abutted against the upper face of the distal end portion 101*b* of the cleaning liquid carrier 101, so that the cleaning liquid carrier 101 is positioned in the horizontal posture. In addition, the pair of protrusions 173 respectively press the pair of arms 95*a* of the holder 95 of the carriage 71, downward. Accordingly, the holder 95 is made to pivot with respect to the slider 91, and the blade 93 is inclined toward the upstream side in the moving direction X1.

Further, the nozzle 155 of the supply pipe 141 supported by the waste liquid tray cover 83 is lowered to the position above the receptacle 111 of the cleaning liquid carrier 101. To be more detailed, as shown in FIG. 12, the tip portion of the nozzle 155 is opposed to the summit of the elevated portion 113 (central dispensing port 115) in the receptacle 111. At this point, it becomes possible to supply the cleaning liquid from the cleaning liquid tank 143 to the cleaning liquid carrier 101.

When the printing operation is started, the sheet is drawn out from the sheet cassette 5, by the sheet feeding roller 7. The sheet that has been drawn out is transported by the transport roller pairs 21 along the transport route 19, to the conveying unit 9. The sheet is transported along the upper orbit of the conveying belt 25 of the conveying unit 9. During this process, the ink is ejected onto the sheet from the recording heads 37 of the head units 11, on the basis of the image data, so that the image is formed on the sheet. Thereafter, the sheet is transported along the transport route 19 by the transport roller pairs 21, and delivered to the output tray 17, by the delivery roller pair 15.

As described above, the head unit 11 is spaced from the cleaning liquid dispensing unit 73, during the printing operation. Therefore, such a trouble that the cleaning liquid accidentally makes contact with the sheet can be prevented.

After the printing operation is finished, the wiping operation is executed at a predetermined timing (description of the covering operation will be skipped). As described above, the wipe unit 53 is located at the standby position, and the cleaning liquid dispensing unit 73 in the wipe unit 53 is located at the supply position.

First, the controller 201 controls the head unit elevation mechanism 41, so as to move the head unit 11 upward, to the retracted position.

Then the controller 201 controls the pump 145, so as to take up the cleaning liquid from the cleaning liquid tank 143 to the piping 181. The cleaning liquid is delivered to the three supply pipes 141, through the piping 181. When the cleaning liquid reaches the connection pipe 151, the pressure of the cleaning liquid passing through the connection pipe 151 is applied to the check valve 157 in the nozzle 155, accommodated in the branch pipe 153, and the check valve 157 is separated from the O-ring 161, against the biasing force of the coil spring 159. Accordingly, the cleaning liquid is supplied from the connection pipe 151, into the nozzle 155 in the branch pipe 153. The cleaning liquid is then supplied to the receptacle 111 of the three cleaning liquid carriers 101, through the respective nozzles 155, to be stored in the receptacle 111. Thus, the nozzle 155 exemplifies the supply port in the disclosure, through which the cleaning liquid is supplied from the cleaning liquid supply source to the receptacle 111.

To be more detailed, the cleaning liquid supplied from the nozzle 155 drops onto the summit of the elevated portion 113 in the receptacle 111, as shown in FIG. 12. Then a part of the cleaning liquid enters the dispensing port 115 formed in the summit, as indicated by a straight arrow in FIG. 12. In addition, another part of the cleaning liquid flows downward from the summit along each side face, and enters the dispensing ports 115 formed in the bottom face on the respective sides of the elevated portion 113. Since the regions in the receptacle 111 on the respective sides of the elevated portion 113 are formed in a valley-like shape, the cleaning liquid that has flowed down to each side of the elevated portion 113 is collected to the dispensing port 115 on each side. The controller 201 operates the pump 145 until the cleaning liquid supplied as above protrudes from the dispensing port 115 in a semispherical shape, and retained in such state, and then stops the operation of the pump 145.

Then the controller 201 controls the waste liquid tray cover elevation mechanism 85, so as to move the waste liquid tray cover 83 upward.

Thereafter, as shown in FIG. 13B, the controller 201 controls the wipe unit moving mechanism 131, so as to move the wipe unit 53 (carriage 71, cleaning liquid dispensing unit 73, and waste liquid tray 75) from the standby position to the wiping position. In this process, the cleaning liquid dispensing unit 73 in the wipe unit 53 moves to the dispensing position, keeping the cleaning liquid protruding in the semispherical shape from the dispensing port 115. The controller 201 then controls the head unit elevation mechanism 41, so as to lower the head unit 11 to the cleaning position.

The head unit 11 is lowered, until the nozzle surface N of the recording head 37 reaches the same height as the lower face of the distal end portion 101*b* of the cleaning liquid carrier 101. In this state, the gap between the lower face of the distal end portion 101*b* of the cleaning liquid carrier 101 and the nozzle surface N of the recording head 37 is covered with the sheet 119. As result, the dispensing port 115 of the cleaning liquid carrier 101 is located between the blade 93 and the nozzle surface N.

Then the controller 201 controls the carriage moving mechanism 97, so as to move the carriage 71 from the travel start position to the travel finish position. Accordingly, the blade 93 passes the dispensing port 115 of the cleaning liquid carrier 101, and moves to the nozzle surface N along the sheet 119, catching and carrying the cleaning liquid protruding from the dispensing port 115. Thus, the wiping operation, in which the blade 93 moves along the nozzle surface N, is performed. Through such wiping operation, the residual ink on the nozzle surface N is wiped off with the cleaning liquid, by the blade 93. The ink thus wiped off and the cleaning liquid drop onto the waste liquid tray 75 located on the lower side, from the lower edge or side edge of the blade 93.

Thereafter, the controller 201 controls the head unit elevation mechanism 41, so as to move the head unit 11 upward, to the standby position. The controller 201 then controls the carriage moving mechanism 97 so as to move the carriage 71 to the travel start position. After that, the controller 201 controls the wipe unit moving mechanism 131 so as to move the wipe unit 53 from the wiping position to the standby position. Further, the controller 201 controls the waste liquid tray cover elevation mechanism 85, so as to move the waste liquid tray cover 83 downward.

As described thus far, the receptacle 111 of the cleaning liquid carrier 101 according to the foregoing embodiment is formed in a recessed shape, with the top face open upward. Therefore, number of corners between the faces of the receptacle 111 adjacent to each other can be reduced. Here, the cleaning liquid tends to form a film at a corner portion. Accordingly, reducing the number of corners leads to reduced likelihood that the cleaning liquid forms a film, thereby preventing the dispensing port 115 from being blocked by the film, and preventing a loss in volume of the receptacle 111. Therefore, the cleaning liquid supplied to the receptacle 111 can be evenly distributed through the plurality of dispensing ports 115.

In particular, since the cleaning liquid drops onto the elevated portion 113 in the receptacle 111, the cleaning liquid that has dropped flows down from the summit of the elevated portion 113 to the bottom face, along the side faces. Accordingly, the cleaning liquid surely flows into the dispensing ports 115 located on the respective sides of the elevated portion 113 in the blade width direction X2. In addition, since the dispensing port 115 is also formed in the elevated portion 113, the cleaning liquid can be evenly distributed, along the blade width direction X2.

The wipe unit 53 includes the carriage 71 and the cleaning liquid dispensing unit 73, which are located at the standby position, while the printing operation is executed. In other words, since the head unit 11 is spaced from the cleaning liquid dispensing unit 73 during the printing operation, the cleaning liquid can be prevented from sticking to the sheet, and the sheet can be prevented from contacting the mechanism for supplying the cleaning liquid, even when the sheet is accidentally curved upward during the printing operation. Therefore, contamination of the sheet with the cleaning liquid, and a damage caused by the sheet to the mechanism for supplying the cleaning liquid, can be prevented.

In addition, the supply pipe 141 of the cleaning liquid supply unit 55 that supplies the cleaning liquid to the cleaning liquid carrier 101 only moves in the up-down direction together with the waste liquid tray cover 83, and not in the left-right direction. Accordingly, the travel distance of the supply pipe 141 is relatively short, and therefore the piping 181 to which the supply pipe 141 is connected can be prevented from being bent and disturbing the flow of the cleaning liquid. Further, the piping 181 can be routed within a narrow space.

The foregoing embodiment represents the case where the four head units 11 are provided for the respective colors, and the maintenance units 13 are provided for the respective head units 11. Instead, the four head units 11 may be configured as a unified unit, and the maintenance unit 13 may include the four cap units 51 and the four wipe unit 53 configured as unified units. Further, the cleaning liquid dispensing unit 73 may be provided on the recording head 37.

In the recording head of the existing ink jet recording apparatus, unlike the one according to the foregoing embodiment, the receptacle of the cleaning liquid is formed in a hollow structure surrounded by the top face, the bottom face, and the four side faces, and therefore the cleaning liquid supplied to the receptacle is prone to form a film at the corners between the faces adjacent to each other. Accordingly, one or more dispensing ports may be blocked by the film, and the amount of the cleaning liquid supplied may become uneven, in the width direction intersecting the moving direction of the blade, or the amount of the cleaning liquid supplied to the receptacle may become insufficient. In such a case, sufficient cleaning effect is unable to be attained.

With the configuration according to the foregoing embodiment, in contrast, the cleaning liquid can be sufficiently supplied, and evenly distributed.

While the present disclosure has been described in detail with reference to the embodiments thereof, it would be apparent to those skilled in the art that the various changes and modifications may be made therein within the scope defined by the appended claims.

What is claimed is:

1. An ink jet recording apparatus comprising:

a recording head including a nozzle surface including a plurality of nozzles, each having an ink outlet oriented downward, the recording head being supported so as to move in an up-down direction;

a blade that wipes the nozzle surface, by moving in a predetermined moving direction in contact with the nozzle surface; and a cleaning liquid dispensing unit that stores therein cleaning liquid supplied from a cleaning liquid supply source, and supplies the cleaning liquid between a travel start position of the blade and the nozzle surface, wherein the cleaning liquid dispensing unit includes a receptacle configured to store the cleaning liquid supplied by the cleaning liquid supply source, the receptacle having a top face open upward, wherein the receptacle includes an elevated portion, formed on a bottom face, at a central portion in a width direction of the blade intersecting the moving direction.

2. The ink jet recording apparatus according to claim 1, further comprising a supply port through which the cleaning liquid is supplied from the cleaning liquid supply source to the receptacle, wherein a summit of the elevated portion is opposed to the supply port, at a separated position.

3. The ink jet recording apparatus according to claim 2, wherein the receptacle includes a plurality of dispensing ports for dispensing the cleaning liquid between the travel start position of the blade and the nozzle surface, and one of the plurality of dispensing ports is formed in the summit of the elevated portion.

4. The ink jet recording apparatus according to claim 3, wherein the plurality of dispensing ports, other than the one formed in the summit of the elevated portion, are formed in the bottom face of the receptacle, at positions adjacent to respective side faces of the elevated portion, each being a sloped face.

5. The ink jet recording apparatus according to claim 2, wherein the receptacle includes a plurality of dispensing ports for dispensing the cleaning liquid between the travel start position of the blade and the recording head of the ink jet recording apparatus, and one of the plurality of dispensing ports is opposed to the supply port, at the separated position.

6. The ink jet recording apparatus according to claim 1, wherein the bottom face of the receptacle is inclined downward, in a direction from a summit of the elevated portion toward a peripheral region.

7. An ink jet recording apparatus comprising:

a recording head including a nozzle surface including a plurality of nozzles, each having an ink outlet oriented downward, the recording head being supported so as to move in an up-down direction;

a blade that wipes the nozzle surface, by moving in a predetermined moving direction in contact with the nozzle surface; and a cleaning liquid dispensing unit that stores therein cleaning liquid supplied from a cleaning liquid supply source, and supplies the cleaning liquid between a travel start position of the blade and the nozzle surface, wherein the cleaning liquid dispensing unit includes a receptacle configured to store the cleaning liquid supplied by the cleaning liquid supply source, the receptacle having a top face open upward, wherein the ink jet recording apparatus further comprises a wipe unit including the blade, and movable between a wiping position where the blade makes contact with the nozzle surface, and a standby position spaced from the nozzle surface, wherein the cleaning liquid dispensing unit is unified with the wipe unit, when the wipe unit moves to the wiping position, the cleaning liquid dispensing unit is configured to move to a dispensing position between the travel start position of the blade and the nozzle surface, and when the wipe unit moves to the standby position, the cleaning liquid dispensing unit is configured to move to a supply position where the cleaning liquid is supplied from the cleaning liquid supply source to the receptacle.

* * * * *